INVENTOR.
Philip L. Francis
BY
Robert L. Spencer
ATTORNEY

Jan. 21, 1964 P. L. FRANCIS 3,118,311
ACCESSORY DRIVE MECHANISM
Filed Nov. 13, 1961 3 Sheets-Sheet 2

INVENTOR.
Philip L. Francis
BY
Robert L. Spencer
ATTORNEY

Jan. 21, 1964 P. L. FRANCIS 3,118,311
ACCESSORY DRIVE MECHANISM
Filed Nov. 13, 1961 3 Sheets-Sheet 3
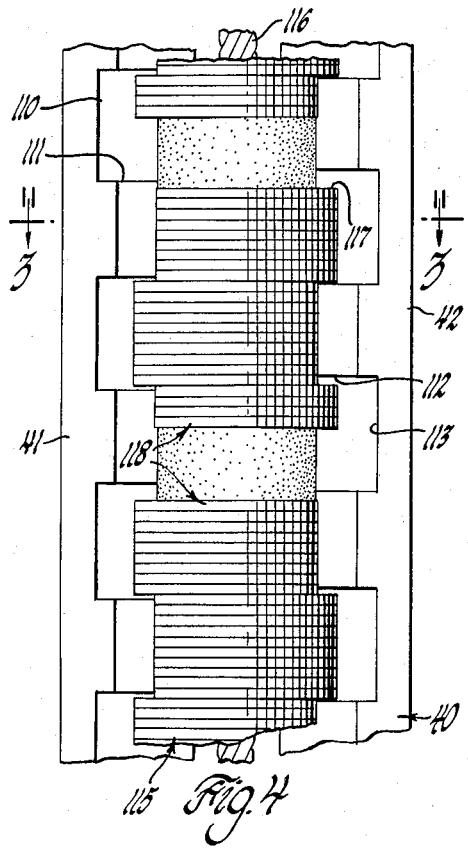
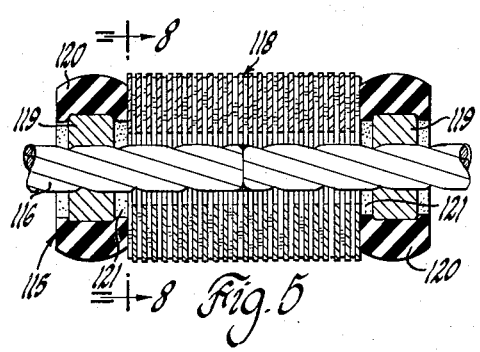
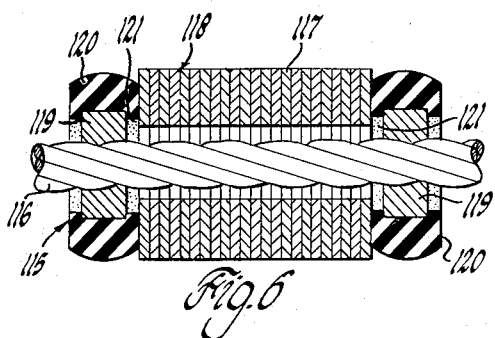
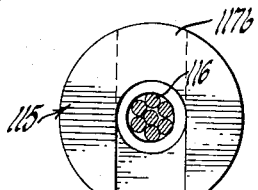
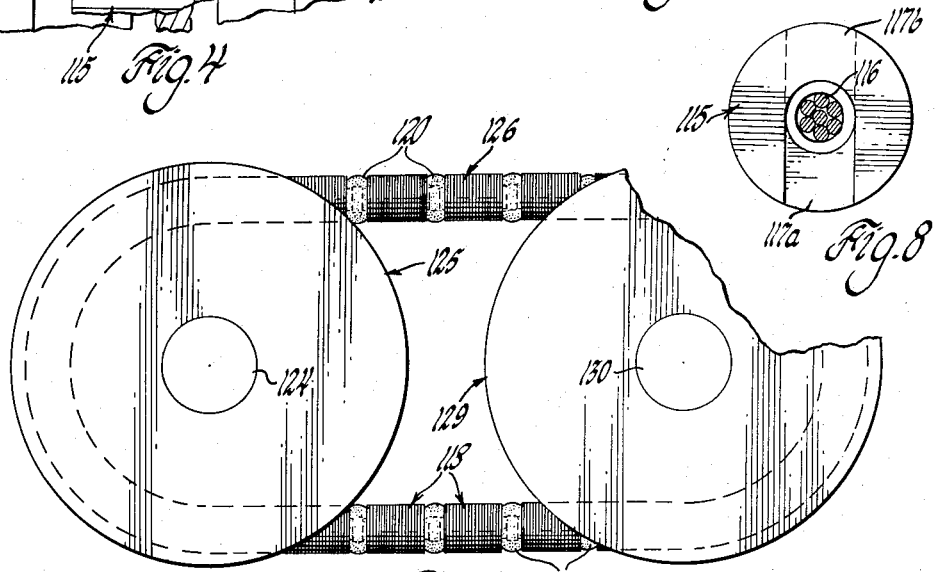
INVENTOR.
*Philip L. Francis*
BY
*Robert L. Spencer*
ATTORNEY United States Patent Office 3,118,311
Patented Jan. 21, 1964

3,118,311
ACCESSORY DRIVE MECHANISM
Philip L. Francis, Rochester, Mich., assignor to General Motors Corporation, Detroit, Mich., a corporation of Delaware
Filed Nov. 13, 1961, Ser. No. 151,626
13 Claims. (Cl. 74—230.17)

This invention relates to accessory drives and more particularly to a belt drive for driving the accessories of a vehicle engine at variable speed with respect to engine speed and constructed and arranged to maintain a substantially constant accessory speed irrespective of variation of engine speed. In the operation of internal combustion engines in automotive applications it is desirable that the accessories such as the cooling fan, generator, power steering pumps and air conditioning compressors, for example, be driven at a substantially constant speed for most efficient operation of the accessory itself and also to reduce power consumption and noise by preventing the accessories from being driven at excess speed.

An object of this invention is to provide an accessory drive unit for driving the accessories of an engine by which the accessories are driven through variable speed ratios tending to maintain the accessory speed more nearly constant.

Another object of this invention is to provide an accessory drive unit incorporating variable diameter pulleys wherein a common actuating member is effective simultaneously on all of the pulleys to synchronize pulley movement and reduce the power required to accomplish pulley movement.

A further object of this invention is to provide an accessory drive unit incorporating a variable diameter pulley and belt arrangement wherein belt slippage is prevented.

An additional object of this invention is to provide an accessory drive unit incorporating variable diameter pulleys all shifted by a common yoke, together with means responsive to the speed of rotation of the power delivery member of the unit for controlling the drive ratio of the unit.

A more particular object of this invention is to provide an accessory drive unit incorporating variable diameter pulleys wherein belt shifting is accomplished by means of a common yoke wherein the yoke and pulleys are arranged such that the yoke not only synchronizes the axial movement of the pulleys but also transmits thrust normally caused by a wedging belt to the opposing pulley such that the axial thrust of any of the pulley sheaves is negated or cancelled out by the axial thrust of an opposing pulley.

Another object of this invention is to provide a novel belt and pulley arrangement wherein the belt is formed of a flexible cable having a series of modules of washers thereon and wherein each module includes a drive ferrule and wherein a flexible ferrule is arranged to retain the washers perpendicular to the flexible cable.

An additional object of this invention is to provide a vacuum actuated belt shifting device having a pair of control chambers adapted to be continuously connected to a vacuum source together with centrifugally-controlled valves for controlling the admission of atmospheric pressure to the control chambers, respectively, and responsive to output speed of the power delivery pulley for reducing the speed of rotation of the power delivery pulley with respect to input speed as the input speed increases.

A further object of this invention is to provide a belt shifting arrangement wherein the conical surfaces of the pulleys have alternate sets of teeth and recesses thereon and wherein the belt is formed of a flexible cable having groups of washers driven by the cable and rotatable with respect to the cable upon entrance of the washers into the recesses of the pulleys to insure even wear on the external periphery of the washers.

These and other objects and advantages of this invention will be apparent from the following description and claims, taken in conjunction with the accompanying drawings, in which:

FIGURE 4 is an elevational view illustrating the registration of the belt washers with the teeth and recesses of the variable diameter pulley.

FIGURE 5 is a sectional view of the belt illustrating the use of relatively thin washers in the module wherein the ends of the belt cable are joined together.

FIGURE 6 is a sectional view through the cable through a module remote from the abutting ends of the cable and illustrating the use of washers of normal thickness.

FIGURE 7 is a schematic diagram of an arrangement including two variable diameter pulleys rather than four as shown in FIGURE 1.

FIGURE 8 is a sectional view taken along the line 8—8 of FIGURE 5.

Figure 1:
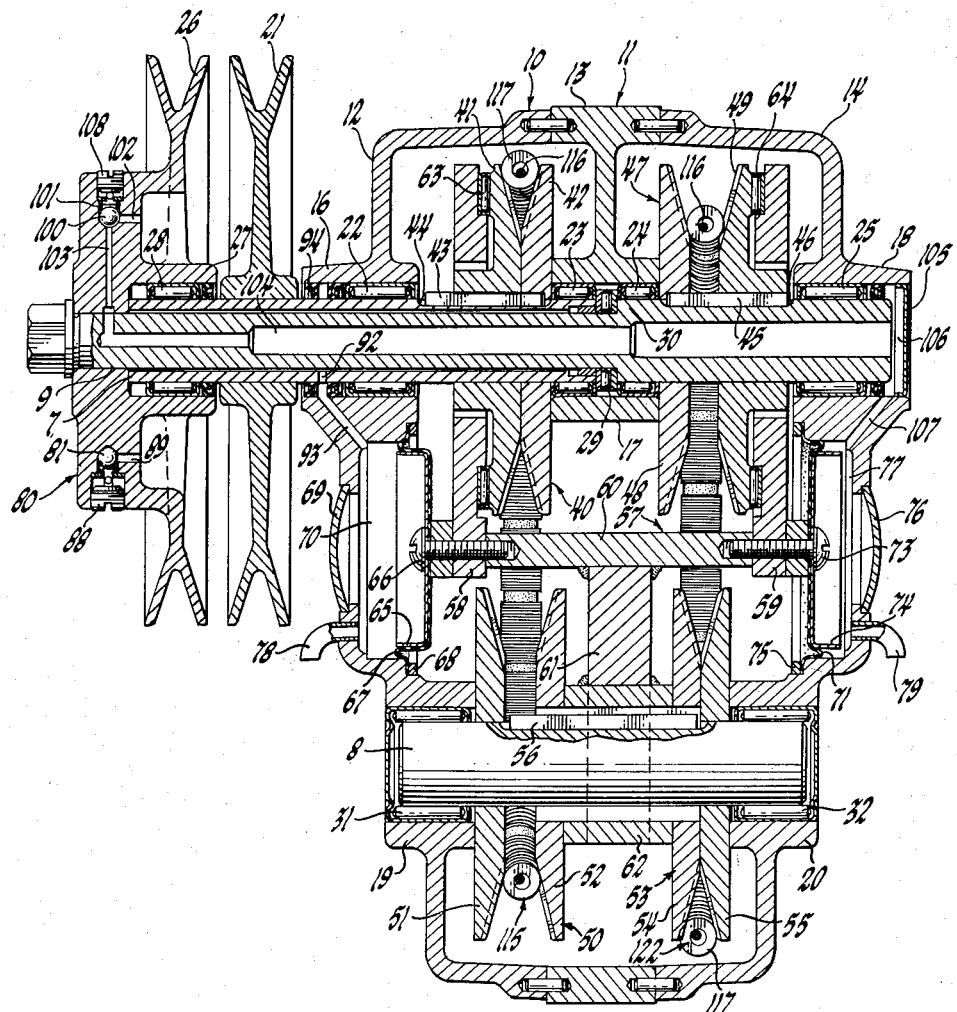
FIGURE 1 is a longitudinal sectional view through an accessory drive unit constructed in accordance with the principles of this invention.
Figure 2:
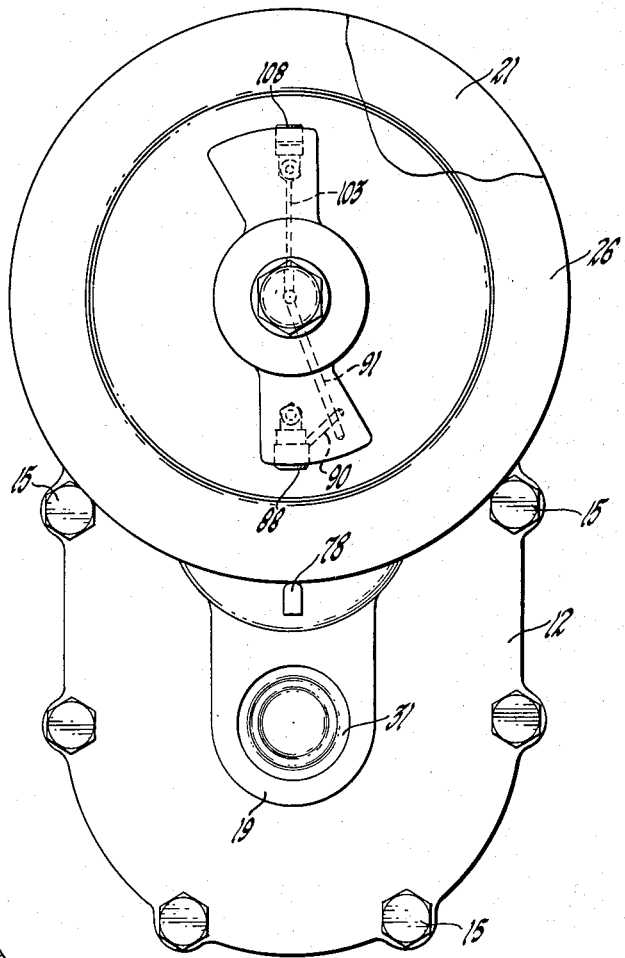
FIGURE 2 is an end view of FIGURE 1.

Referring to FIGURE 1 there is shown an accessory drive assembly generally designated at 10 and constructed in accordance with the principles of this invention. A support housing generally indicated at 11 is composed of three sections 12, 13, and 14 joined together by bolts 15 (see FIGURE 2) to be readily detachable for service and assembly purposes. Housing sections 12, 13 and 14 are shaped to form support bosses 16, 17 and 18 for rotatably supporting a power input shaft 7 and a power delivery shaft 9 and bosses 19 and 20 for rotatably supporting a countershaft 8 axially offset from and extending parallel to shafts 7 and 9. Power input shaft 7 driven by a pulley 21 is rotatably supported by means of bearings 22 and 23 in bosses 16 and 17, respectively. Power delivery shaft 9 is supported for rotation by means of shaft 7 and by bearings 24 and 25 in hubs 17 and 18, respectively. A power delivery pulley 26 on shaft 9 has its hub 27 supported upon power input shaft 7 by means of a bearing 28. A roller thrust bearing 29 is disposed in support hub 17 between the end of power input shaft 7 and a raised land 30 on power delivery shaft 9. Countershaft 8 is supported for rotation in boss 19 by means of a bearing 31 and in boss 20 by means of a bearing 32.

A power input pulley designated generally at 40 is composed of split sheaves 41 and 42, both sheaves being keyed for rotation with power input shaft 7 by a key 43. Key 43 fits into a recess 44 on power input shaft 7 and retains pulley sheave 42 against axial motion while permitting axial motion of pulley 41 with respect to pulley 42. The end of key 43 abuts the base of pulley 42 to prevent axial motion of pulley 42. In a similar manner, a key 45 fitted into a recess 46 of power delivery shaft 9 retains a sheave 48 of a split power delivery pulley indicated generally at 47 against axial motion with respect to shaft 9 and at the same time permits axial motion of pulley sheave 49 with respect to pulley sheave 48. The fixed pulleys 42 and 48 are disposed adjacent support hub 17 and adjacent each other. The axial movable pulleys 41 and 49 are disposed remote from each other axially outwardly in the assembly. Key 45 abuts pulley sheave 48 to prevent axial motion of sheave 48.

A split pulley indicated generally at 50 on countershaft 8 is composed of pulley sheaves 51 and 52. A second split pulley indicated generally at 53 is composed of pulleys 54 and 55. Pulleys 51 and 55 are press fitted to countershaft 8 to be rotatable with the shaft and to prevent axial motion of the pulleys. Axial movable pulleys 52 and 54 are keyed to shaft 8 by a key 56 and are axially movable with respect to shaft 8. A Y-shaped yoke indicated generally at 57 is composed of two spaced end plates 58 and 59 disposed adjacent movable pulley sheaves 41 and 49 and rigidly joined to each other by a connector member 60. A central base member 61 rigidly fixed to connector 60 is fixed to a tubular spacer 62 disposed between movable sheaves 52 and 54. The yoke assembly including end members 58 and 59, connector 60, base 61 and spacer 62 are all joined together for axial motion as a unit. Needle thrust bearings 63 and 64 are disposed between end plate 58 and pulley sheave 41 and between end plate 59 and pulley sheave 49, respectively.

A diaphragm 67 is mounted upon housing section 12 and fixed to connector member 60 by means of a diaphragm protector 65 and a screw 66, the free periphery of the diaphragm 67 being fixed to housing section 12 by means of a snap ring 68. An opening in the end of housing section 12 is closed by a cover 69 so that a chamber 70 is formed between diaphragm 67 and housing section 12. A second diaphragm 71 is mounted upon housing section 14 and fixed to connector 60 by means of a screw 73 and a diaphragm protector 74, the free periphery of the diaphragm 71 being fixed to housing section 14 by means of a snap ring 75. An opening in housing section 14 is closed by a cover 76 to form a chamber 77 between diaphragm 71 and housing section 14. Chamber 70 is connected to a source of vacuum, such as an internal combustion engine intake manifold or a vacuum pump (not shown) by means of a pipe 78. Chamber 77 is similarly connected to the same source of vacuum by means of a pipe 79.

Figure 1A:
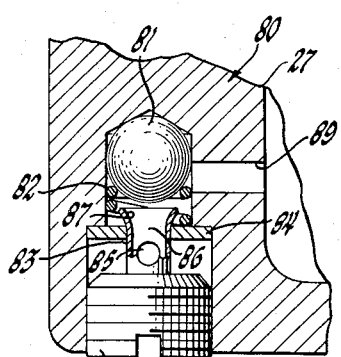
FIGURE 1A is an enlarged view of one of the control valves for controlling the drive ratio illustrating the details of the valve.

Control of the admission of atmospheric pressure to chamber 70 is by means of a centrifugal ball governor indicated generally at 80 (see FIG. 1A) carried by pulley hub 27. Governor 80 includes a ball valve 81 spring-biased by a spring 82 to admit atmospheric pressure to chamber 70 when the speed of rotation of power delivery pulley is less than a predetermined speed, for example 2000 revolutions per minute. A tube 83 having a valve seat 87 formed thereon and a central passage 86 in communication with a cross passage 85 is retained in a fixed position in pulley hub 27 by means of a support washer 84. A screw plug 88 closes off one end of tube 83 and serves to support the tube. Spring 82 normally unseats ball valve 81 from seat 87 to permit atmospheric pressure to pass through a passage 89 in hub 27, through control passage 86 in tube 83 to cross passage 85. Atmospheric pressure is permitted to enter chamber 70 by way of passages 90, 91 formed in hub 27 (see FIG. 2) and between shafts 7 and 9 to a port 92 in power input shaft 7 to a passage 93 (see FIG. 1) in housing support member 16. A seal 94 prevents leakage of air into passage 93 along shaft 7.

Control of the admission of atmospheric pressure to chamber 77 is by means of a second ball governor valve 100 spring-biased by a spring 101 to block off a passage 102 from a passage 103 in hub 27. Passage 103 communicates with a passage 104 in power delivery shaft 9. A cover 105 in support member 18 forms a chamber 106 at the end of shaft 9 and is connected to chamber 77 by means of a passage 107 formed in support member 18. A screw plug 108 forms a seat for spring 101 and provides for adjustment of spring tension of spring 101. In operation, spring 101 will initially position ball valve 100 to block off passage 102 from passage 103 and retain the ball valve in its closed position until power delivery pulley 26 attains a predetermined speed of rotation, for example 2200 revolutions per minute.

Figure 3:
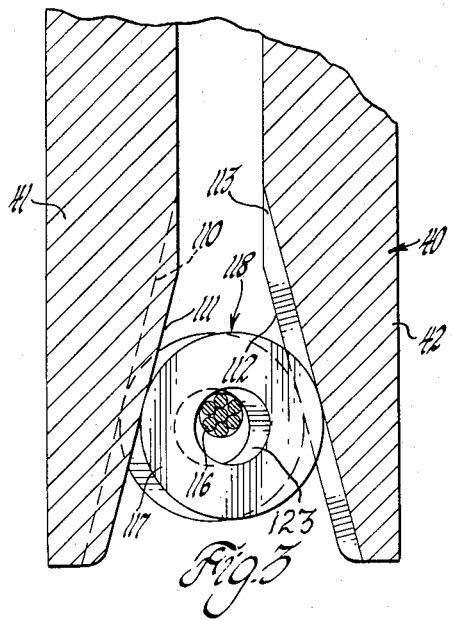
FIGURE 3 is a sectional view taken along the line 3—3 of FIGURE 4 illustrating the registration of the belt washers with the teeth and recesses of the variable diameter pulley.

In order to provide a belt capable of drive without slipping, squeal and glazing as is common when conventional V-belts are used, novel belt and pulley arrangement shown particularly in FIGURES 3 through 6 has been provided. Referring particularly to FIGURES 3 and 4, the pulley sheaves comprising each pulley assembly have their cone-shaped surfaces formed to provide a series of recesses and teeth. For example, the cone surface of pulley sheave 41 has a series of recesses 110 formed thereon and spaced from each other by raised teeth 111. The alternate sets of recesses 110 and teeth 111 extend axially on the cone-shaped surface and entirely around the surface. In a similar manner, pulley sheave 42 has a series of raised teeth 112 and recesses 113 formed thereon. All of the teeth 111—112 are of the same width. All of the recesses 110—113 are likewise of the same width, but the recesses are each of greater width than the width of the teeth. In assembling the pulley, the pulley sheaves are arranged such that the teeth on one pulley sheave will be disposed axially opposite the recesses on the other pulley sheave, as shown in FIGURE 4.

The belt 115 is an endless belt composed of a flexible cable 116 having its free ends welded together and having a multiplicity of metallic washers 117 strung thereon. The washers 117 are assembled into a series of spaced modules of a predetermined number of washers, for example twenty-three, in each module. Each module 118 is prevented from slipping along the cable by a ferrule 119 swaged or crimped to the cable. The washers 117 each have a central circular opening 123 for receiving the cable as best shown in FIGURE 3, the opening 123 being of somewhat greater diameter than that of the cable 116. In order to prevent the washers from feeding into the pulleys in an improper and irregular manner, a resilient ferrule 120, preferably made of rubber, is placed over each of the metallic driving ferrules 119. The resilient ferrule 120 is made such that its length is greater than the accumulated clearance axially of a module of washers. As will be seen, each metallic ferrule 119 is swaged on cable 116 so as to provide a clearance space 121 between the end of the stacked assembly of washers and the metallic ferrule to provide a predetermined clearance needed at the time the belt is wrapped around the pulley. The axial length of each flexible ferrule 120 is greater than the clearance space 121 so that the washers in each module are biased together. This spring effect of the rubber ferrules 120 produces a preloaded condition or axial thrust on the washers of each module which stabilizes the module and causes the washers to assume a position perpendicular to the cable 116. As stated, the ends of the flexible cable are butt-welded together. The module at which the weld occurs is completed by forming the washers from a stack of washers each being one-half the thickness of the other washers. These special washers are each made with a notch or slit 117a (see FIG. 8) cut therein and extending from the circumference to the center hole.

In FIGURE 8, the slit in one washer is indicated at 117a, and the slit in the adjacent washer at 117b. When two of these washers have been slipped onto the cable with their notches 180° apart, the two washers are cemented together to form a washer of standard thickness. This process is duplicated until the module adjacent the butt weld is completed. The module containing the assembly of split and cemented washers is shown in FIGURE 5. A complete belt assembly will include a sufficient number of individual modules to provide the length of belt required for any given application. Belts 115 and 122 of FIGURE 1 each comprise 26 modules, each module having 23 washers disposed between the ferrules 119 and resilient ferrules 120 carried by the metallic ferrules 119. The solid washers, twenty-three in number, representative of all modules other than the module adjacent the butt weld, are shown in FIGURE 6. Belt 122 of FIGURE 1 is similar in structure to belt 115.

The belt structure has proved to be quiet and positive in operation and to prevent slippage and glazing of the belt as often occurs when standard V-belts are used. As the washers enter the grooves in the pulleys, due to rolling contact with the pulley grooves, they rotate with respect to the cable, thereby assuring even wear of the circumference of the washers and a long useful life. The washers are inexpensive, being formed of metal stampings, and make possible a low cost belt. Each module, or assembly group of washers is prevented from slipping along the cable by the metallic drive ferrules swaged or otherwise fastened to the cable. As the washers engage the teeth machined on the conical surfaces of the pulley sheaves the tooth on one side pushes the required number of washers into the groove on the other side. Since the teeth are machined as segments of a circle, the tooth and groove width diminish as they approach toward the shaft centerline. Because of this tapering down effect, fewer washers can enter the groove as they travel toward the shaft centerline and these excess washers are merely pushed into the groove on the opposite side of the pulley. This ability to automatically select the required number of washers for any pitch diameter produces positive engagement of the belt and pulley, yet allows the ratio to be changed by varying the pitch diameter of the pulleys. The teeth and grooves of each set of pulleys are indexed to provide proper engagement of the washers. In order to prevent any attempt at fractional washer thickness engagement, the tooth is formed to be the thickness of one washer narrower than the groove.

In accomplishing belt shifting for change of drive ratio, the control of all axially movable pulley sheaves is accomplished through the Y-shaped yoke so that all movable pulleys are moved axially simultaneously. The yoke not only synchronizes the movement of the pulleys, but also transmits the thrust, normally caused by a wedging belt, to the opposing pulley on the other shaft. Due to the yoke and pulley arrangement the axial thrust from any of the pulley halves is negated by the thrust from an opposing pulley. This cancellation of axial thrust makes possible the use of much less force to produce a ratio change than would be required in the absence of the yoke.

It will readily be understood that when either chamber 70 or 77 is air evacuated the diaphragm associated with such chamber will pull the yoke and axially movable pulley sheaves toward such chamber. If both chambers are evacuated equally no yoke movement will occur. Both chambers 70 and 77 are continuously connected to a source of vacuum. If air is allowed to bleed into either chamber the opposing diaphragm will draw the yoke toward itself, to alter the output speed. As stated, the governor is arranged to initially permit air to enter chamber 70 so that diaphragm 71 will pull the yoke to the right, as viewed in FIGURE 1 to establish maximum speed of output shaft 9 with respect to input shaft 7. Governor valve 81 is normally open at output shaft speeds below 2000 r.p.m. and closes at 2000 r.p.m. Governor valve 100 is normally closed at speeds of rotation of output shaft 9 below 2200 r.p.m. and opens at output shaft speed of 2200 r.p.m.

The differential of 200 r.p.m. between the speed at which valve 81 closes and valve 100 opens is to provide a hysteresis effect to prevent "hunting" of the device.

In FIGURE 1, there is shown a series of four variable diameter pulleys constructed and arranged to provide a double speed ratio change by means of pulleys 50 and 53 and the countershaft. This arrangement is very compact in size and particularly adapted for use in automotive vehicles where large change of ratio is desired in a drive unit which can be fitted into limited space requirements. It will readily be understood that in applications wherein only a single reduction is desired, a single set of variable diameter pulleys would be employed, with the control valves being mounted in the output pulley of the assembly. Such an arrangement is shown diagrammatically in FIGURE 7 wherein a variable diameter pulley 125 may be driven from the engine (not shown) by means of a shaft 124, and may drive a variable diameter pulley 129 which drives a power delivery shaft 130 by means of a belt 126. Belt 126 may consist of 26 modules constructed in accordance with the teachings of FIGURES 3 through 6. The control valves 100 and 81 of FIGURE 1 would be mounted in power delivery pulley 129 for controlling the drive ratio and the variable diameter pulleys 125 and 126 each includes conical surfaces on the pulley sheaves having teeth and recesses constructed and arranged to receive and act upon the belt washers as taught particularly in FIGURES 3 and 4.

What is claimed is:

1. A variable speed drive for driving the accessories of an engine comprising a first variable diameter pulley driven by said engine at a speed proportional to engine speed, said pulley having a first sheave fixed against axial motion and a second sheave adapted to be moved axially with respect to said first sheave, a second variable diameter pulley having a first sheave fixed against axial motion and a second sheave adapted to be moved axially, belt means connecting said first pulley to said second pulley for driving said second pulley, means connecting said second pulley to said accessories for driving the same, a yoke connecting said first-mentioned axially movable sheave to said second-mentioned axially movable sheave for synchronizing axial motion of said sheaves, actuator means operative upon said yoke for moving said yoke to change the drive ratio of said unit, said actuator means comprising spaced diaphragms each connected to said yoke and forming a movable wall of first and second control chambers, respectively, means continuously connecting both of said control chambers to a source of vacuum, first and second passages connected to said control chambers, respectively, for admitting atmospheric pressure to said control chambers, respectively, and first and second centrifugally responsive valves for controlling the admission of atmospheric pressure to said control chambers, respectively, through said first and second passages, respectively.

2. A variable speed drive for driving the accessories of an engine comprising a first variable diameter pulley driven by said engine at a speed proportional to engine speed, said pulley having a first sheave fixed against axial motion and a second sheave adapted for axial motion, a second pulley having a first sheave fixed against axial motion and a second sheave adapted for axial motion, belt means connecting said pulleys, means connecting said second pulley to said accessories for driving the same, an axially movable yoke operatively connected to both of said axially movable sheaves for synchronizing the axial motion of said sheaves, means forming spaced chambers and continuously connected to a source of vacuum including first and second axially movable elements connected to said yoke, means for controlling the effective vacuum in said chambers whereby the axial position of said yoke may be varied comprising first and second passages for connecting said chambers to atmosphere and first and second centrifugally responsive valves, said valves being movable in response to increase in speed of rotation thereof from a first position wherein said first passage is blocked off from atmosphere and said second passage is open to atmosphere to a second position wherein both of said passages are blocked off from atmosphere, said valves being further movable upon further increase in speed of rotation thereof to a third position wherein said first passage is connected to atmosphere and said second passage is blocked off from atmosphere.

3. A variable speed drive for driving the accessories of an engine comprising a first variable diameter pulley driven by said engine at a speed proportional to engine speed, said pulley having a first sheave fixed against axial motion and a second sheave adapted for axial motion, a second pulley having a first sheave fixed against axial motion and a second sheave adapted for axial motion, belt means connecting said pulleys, means connecting said second pulley to said accessories for driving said accessories, an axially movable yoke operatively connected to both of said axially movable sheaves for synchronizing the axial motion of said sheaves, means forming spaced chambers including spaced axially movable members connected to said yoke, means continuously connecting said chambers, respectively, to a source of vacuum, said spaced axially movable members being movable in response to differential vacuum in said chambers, means for controlling the effective vacuum in said chambers, respectively, including first and second centrifugally responsive valves, operatively connected to said chambers, respectively, means yieldably biasing said first valve to a first position to block off a first one of said chambers from atmosphere, means biasing said second valve to a first position to connect a second one of said chambers to atmosphere, said second valve being movable in response to centrifugal force to move to a second position to block off said second chamber from atmosphere when said first valve is still in its first position, said first valve being movable in response to further increase in centrifugal force to a second position to connect said first chamber to atmosphere after said second valve has moved to its second position.

4. A variable speed drive for driving the accessories of an engine comprising a first variable diameter pulley driven by said engine at a speed proportional to engine speed, said pulley having a first sheave fixed against axial motion and a second sheave adapted to be moved axially, a second pulley having a first sheave fixed against axial motion and a second sheave adapted to be moved axially, belt means connecting said pulleys, means connecting said second pulley to said accessories for driving the same, an axially movable yoke operatively connected to both of said axially movable sheaves for synchronizing the axial motion of said sheaves, means forming spaced chambers including spaced axially movable members each connected to said yoke, means continuously connecting said chambers, respectively, to said engine as a source of vacuum, said spaced axially movable members being movable in response to differential vacuum in said chambers to displace said yoke axially, and means for controlling the effective vacuum in said chambers, respectively, including first and second centrifugally responsive valves operatively connected to said chambers, respectively, said valves each being driven at a speed proportional to accessory speed of rotation, spring means yieldably biasing said first valve to a first position to block off a first one of said chambers from atmosphere, spring means yieldably biasing said second valve to a first position to connect a second of said chambers to atmosphere, said second valve being movable in response to a predetermined speed of rotation thereof to a second position to block off said second chamber from atmosphere, said first valve being movable in response to a higher predetermined speed of rotation than said first-mentioned predetermined speed of rotation to connect first one of chambers to atmosphere.

5. A variable speed drive for driving the accessories of an engine comprising a first variable diameter pulley driven by said engine at a speed proportional to engine speed, said pulley having a first sheave fixed against axial motion and a second sheave adapted to be moved axially, a second pulley having a first sheave fixed against axial motion and a second sheave adapted to be moved axially, belt means connecting said pulleys, means connecting said second pulley to said accessories for driving the same, an axially movable yoke operatively connected to both of said axially movable sheaves for synchronizing the axial motion of said sheaves, means forming spaced chambers including spaced axially movable members each connected to said yoke, means simultaneously and continually connecting said chambers, respectively, to said engine as a source of vacuum, said spaced axially movable members being movable in response to differential vacuum in said chambers to displace said yoke axially, and means for controlling the effective vacuum in said chambers, respectively, including first and second centrifugally responsive valves operatively connected to said chambers, respectively, said valves each being driven at a speed proportional to accessory speed of rotation, one of said valves being open at speeds of rotation below a predetermined speed to admit atmospheric pressure to one of said chambers and the other of said valves being closed at such speeds of rotation, said one valve being closed at speeds of rotation above said predetermined speed of rotation and said other valve being open at a still higher predetermined speed of rotation, to connect a second of said chambers to atmosphere subsequent to the closing action of said one valve to provide a time interval during which both of said chambers are simultaneously connected to vacuum and blocked off from atmosphere.

6. A variable speed drive for driving the accessories of an engine comprising a power input shaft driven at a speed proportional to engine speed, a countershaft, a power output shaft operatively connected to drive said accessories, a first pulley driven by said power input shaft and having a first sheave fixed against axial motion and a second sheave adapted for axial motion, a second pulley for driving said countershaft having a first sheave fixed against axial motion and a second sheave adapted for axial motion, belt means connecting said first pulley to said second pulley for driving said countershaft, a third pulley driven by said countershaft, said third pulley having one sheave fixed against axial motion and a second pulley adapted for axial motion, a fourth pulley for driving said power output shaft, said fourth pulley having a first sheave fixed against axial motion and a second sheave adapted for axial motion, belt means operatively connecting said third pulley to said fourth pulley for driving said fourth pulley, an axially movable yoke operatively connected to all four of said axially movable sheaves for synchronizing the axial movement of said sheaves, first and second chambers each continuously connected to a source of vacuum, an axially movable element in said first chamber connected to said yoke, an axial movable element in said second chamber connected to said yoke, said axially movable elements being responsive to differential vacuum in said chambers, respectively, for varying the position of said yoke, and valve means for controlling the vacuum in said chambers, respectively, said valve means comprising a first centrifugally responsive ball valve driven by said power output shaft for alternately admitting atmospheric pressure to said first chamber and blocking off said first chamber from atmosphere, and a second ball valve for alternately admitting atmospheric pressure to said second chamber and blocking off said second chamber from atmosphere, a spring yieldably biasing said first valve to block off said first chamber from atmosphere, a spring yieldably biasing said second valve to connect said second chamber to atmosphere, said first-mentioned axially movable element being effective in response to vacuum in said first chamber to move said yoke to increase the speed of said output shaft relative to that of said input shaft, said second valve being movable against its spring in response to a predetermined speed of rotation thereof to block off said second chamber from atmosphere to prevent further increase in speed of rotation of said output shaft relative to that of said input shaft, said first valve being movable against its spring at a second predetermined speed of rotation higher than said first-mentioned predetermined speed of rotation to connect said first chamber to atmosphere, the axially movable element in said second chamber thereupon being effective to move said yoke to decrease the speed of rotation of said output shaft relative to that of said input shaft.

7. A variable speed drive for driving the accessories of an engine comprising a power input shaft driven at a speed proportional to engine speed, a countershaft, a power output shaft operatively connected to drive said accessories, a first pulley driven by said power input shaft, a second pulley on said countershaft, belt means connecting said first to said second pulley for driving said countershaft, a third pulley on said countershaft and driven by said countershaft, a fourth pulley on said output shaft, belt means connecting said third pulley to said fourth pulley for driving said output shaft, each of said pulleys having one sheave fixed against axial motion and a second sheave adapted for axial motion, an axially movable yoke operatively connected to each of said axially movable sheaves for simultaneously moving each of said sheaves, a first chamber continuously connected to said engine as a source of vacuum, vacuum responsive means connected to said yoke and responsive to vacuum in said first chamber to move said yoke to increase the speed ratio of said drive unit, a second chamber continuously connected to said engine as a source of vacuum, a second vacuum responsive means connected to said yoke and responsive to vacuum in said second chamber to move said yoke to decrease the drive ratio of said drive unit, and valve means responsive to speed of rotation of said power output shaft for controlling the vacuum in said chambers, respectively, said valve means including a first valve for controlling the vacuum in said first chamber and normally spring biased to block off said first chamber from atmosphere, said valve means also including a second valve for controlling the vacuum in said second chamber and normally spring biased to connect said second chamber to atmosphere, said second valve being movable in response to centrifugal force at a predetermined speed of rotation thereof to block off said second chamber from atmosphere and said first valve subsequently being movable in response to centrifugal force at a higher predetermined speed of rotation thereof to subsequently connect said first chamber to atmosphere.

8. A variable speed drive for driving the accessories of an engine comprising a power input shaft driven at a speed proportional to engine speed, a countershaft, a power output shaft connected to drive said accessories, a first pulley driven by said power input shaft, a second pulley on said countershaft, belt means connecting said first pulley to said second pulley for driving said countershaft, a third pulley driven by said countershaft, a fourth pulley on said output shaft, belt means connecting said third pulley to said fourth pulley for driving said output shaft, each of said pulleys having one sheave fixed against axial motion and a second sheave adapted to be moved axially, an axially movable yoke operatively connected to each of said axially movable sheaves for simultaneously moving all of said sheaves, means including a first diaphragm forming a first chamber, said diaphragm being connected to said yoke, means continuously connecting said first chamber to said engine as a source of vacuum, said first diaphragm being operative upon said yoke to bias said yoke toward a position to increase the speed of rotation of said output shaft relative to the speed of rotation of said input shaft, means including a second diaphragm forming a second chamber, said second diaphragm being connected to said yoke, means continuously connecting said second chamber to said source of vacuum, said second diaphragm being operative upon said yoke to bias said yoke toward a position to decrease the speed of rotation of said output shaft relative to the speed of rotation of said input shaft, valve means responsive to the speed of rotation of said output shaft for controlling the vacuum in said first chamber, and additional valve means responsive to the speed of rotation of said output shaft for controlling the vacuum in said second chamber, said first-mentioned valve means including a centrifugally responsive valve member and a spring normally operative on said valve member to position said valve member to block off said first chamber from atmosphere, said additional valve means including a second valve member and a spring normally effective to position said second valve member to connect said second chamber to atmosphere, said second valve member being movable in response to a predetermined speed of rotation to block off said second chamber from atmosphere prior to movement of said first valve member from its normal position, said first valve member being movable in response to a higher predetermined speed of rotation thereof and subsequent to movement of said second valve member to its second position to a second position to connect said first chamber to atmosphere.

9. A variable speed drive for driving the accessories of an engine comprising a power input shaft driven at a speed proportional to engine speed, a countershaft, a power output shaft connected to drive said accessories, a first pulley driven by said power input shaft, a second pulley on said countershaft, belt means connecting said first pulley to said second pulley for driving said countershaft, a third pulley driven by said countershaft, a fourth pulley on said output shaft, belt means connecting said third pulley to said fourth pulley for driving said output shaft, each of said pulleys having one sheave fixed against axial motion and a second sheave adapted to be moved axially, an axially movable yoke operatively connected to each of said axially movable sheaves for simultaneously moving all of said sheaves, means including a first diaphragm forming a first chamber, said diaphragm being connected to said yoke, means continuously connecting said first chamber to a source of vacuum, said first diaphragm being operative upon said yoke to bias said yoke toward a position to increase the speed of rotation of said output shaft relative to the speed of rotation of said input shaft, means including a second diaphragm forming a second chamber, said second diaphragm being connected to said yoke, means continuously connecting said second chamber to said source of vacuum, said second diaphragm being operative upon said yoke to bias said yoke toward a position to decrease the speed of rotation of said output shaft relative to the speed of rotation of said input shaft, valve means responsive to the speed of rotation of said output shaft for controlling the vacuum in said first chamber, said first-mentioned valve means including a first valve member and a spring normally positioning said valve member to block off said first chamber from atmosphere, and additional valve means responsive to the speed of rotation of said output shaft for controlling the vacuum in said second chamber, said additional valve means including a second valve member and an additional spring normally positioning said second valve member to connect said second chamber to atmosphere, said first mentioned valve means being closed at output shaft speeds below a predetermined speed of rotation and open at output shaft speeds above said predetermined speed of rotation, said second mentioned valve means being open at output shaft speeds below a second predetermined speed of rotation and closed at output shaft speeds above said second predetermined speed of rotation, said second-mentioned predetermined speed of rotation being less than said first-mentioned predetermined speed of rotation to provide a speed range intermediate said first and second predetermined speeds of rotation wherein both of said chambers are simultaneously blocked off from atmosphere.

10. A variable speed drive for driving the accessories of an engine comprising a first variable diameter pulley driven by said engine at a speed proportional to engine speed, said pulley having a first sheave fixed against axial motion and a second sheave adapted to be moved axially, said sheaves each having a conical surface having a series of axially extending teeth and recesses formed thereon, a second variable diameter pulley having a first sheave fixed against axial motion and a second sheave adapted to be moved axially with respect to said first sheave of said second pulley, each of the sheaves of said second pulley having a conical surface having a series of axially extending teeth and recesses thereon, belt means connecting said first pulley to said second pulley for driving said second pulley, said belt means comprising a flexible cable having a plurality of spaced modules thereon, each module comprising a series of washers strung on said cable, said washers having a circular opening therethrough of greater diameter than the diameter of said cable for receiving said cable and for permitting said washers to rotate relative to said cable, said washers being in registry with the teeth and recesses of said conical surfaces, means for connecting said second pulley to said accessories for driving said accessories, a yoke extending between said axially movable sheaves for simultaneously moving said sheaves, and actuator means operative upon said yoke for moving said yoke to vary the drive ratio of said drive unit.

11. A variable speed drive for driving the accessories of an engine comprising a first variable diameter pulley driven by said engine at a speed proportional to engine speed, said pulley having a first sheave fixed against axial motion and a second sheave adapted to move axially, said sheaves each having a conical surface having a series of axially extending teeth and recesses formed thereon, the teeth on each conical surface being in registry with the recesses on the other conical surface, a second variable diameter pulley having a first sheave fixed against axial motion and a second sheave adapted to move axially, each of the sheaves of said second pulley having a conical surface having a series of axially extending teeth and recesses formed thereon, the teeth on each conical surface of said second pulley sheave being in registry with the recesses on the other conical surface of said second pulley, a belt connecting said first pulley to said second pulley for driving said second pulley, said belt comprising a flexible cable having a plurality of spaced ferrules secured to said cable, a stacked assembly of washers mounted on said cable between each adjacent pair of ferrules, the spacing between adjacent ferrules being greater than the length of each stacked assembly of washers, means carried by said cable and disposed between the adjacent ends of each stacked assembly of washers for positioning each stacked assembly of washers at right angles to said cable, said washers having a central circular opening therethrough of greater diameter than the diameter of said flexible cable for permitting said washers to rotate relative to said cable, said washers being in registry with the teeth and recesses of each of said pulleys, means for connecting said second pulley to said accessories for driving the same, a yoke extending between said axially movable sheaves for simultaneously moving said sheaves, vacuum responsive actuator means operative upon said yoke for moving said yoke to vary the drive ratio, said vacuum responsive means including first and second diaphragms connected to said yoke and disposed in first and second control chambers each continuously connected to a source of vacuum, and first and second centrifugally responsive valves for selectively connecting said control chambers to atmosphere and blocking off said control chambers, respectively, from atmosphere.

12. A variable speed drive for driving the accessories of an engine comprising a first variable diameter pulley driven by said engine at a speed proportional to engine speed, said pulley having a first sheave fixed against axial motion and a second sheave adapted to move axially, said sheaves each having a conical surface having a series of axially extending teeth and recesses formed thereon, the teeth on each conical surface being in registry with the recesses on the other conical surface, a second variable diameter pulley having a first sheave fixed against axial motion and a second sheave adapted to move axially, each of the sheaves of said second pulley having a conical surface having a series of axially extending teeth and recesses formed thereon, the teeth on each conical surface of said second pulley sheave being in registry with the recesses on the other conical surface of said second pulley, a belt connecting said first pulley to said second pulley for driving said second pulley, said belt comprising a flexible cable having a plurality of spaced ferrules secured to said cable, a stacked assembly of washers mounted on said cable between each adjacent pair of ferrules, the spacing between adjacent ferrules being greater than the length of each stacked assembly of washers, flexible means carried by said cable and disposed between the adjacent ends of each stacked assembly of washers for positioning each stacked assembly of washers at right angles to said cable, said washers having a central circular opening therethrough of greater diameter than the diameter of said flexible cable for permitting said washers to rotate relative to said cable, said washers being in registry with the teeth and recesses of each of said pulleys, means for connecting said second pulley to said accessories for driving the same, a yoke extending between said axially movable sheaves for simultaneously moving said sheaves, and actuator means operative upon said yoke for moving said yoke to vary the drive ratio of said drive unit, said actuator means comprising first and second chambers each continuously connected to a source of vacuum and vacuum responsive means responsive to vacuum in said chambers, respectively, and connected to said yoke, and valve means for controlling the vacuum in said chambers, respectively, said valve means including a first centrifugally responsive valve for alternately connecting a first one of said chambers to atmosphere and blocking off said first chamber from atmosphere and a spring normally effective to position said valve to block off said first chamber from atmosphere, said valve means also including a second centrifugally responsive valve for alternately connecting a second of said chambers to atmosphere and blocking off said second chamber from atmosphere and a spring normally effective to position said second valve to connect said second chamber to atmosphere.

13. A variable speed drive for driving the accessories of an engine comprising a first variable diameter pulley driven by said engine at a speed proportional to engine speed, said pulley having a first sheave fixed against axial motion and a second sheave adapted to move axially, said sheaves each having a conical surface having a series of axially extending teeth and recesses formed thereon, the teeth on each conical surface being in registry with the recesses on the other conical surface, a second variable diameter pulley having a first sheave fixed against axial motion and a second sheave adapted to move axially, each of the sheaves of said second pulley having a conical surface having a series of axially extending teeth and recesses formed thereon, the teeth on each conical surface of said second pulley sheave being in registry with the recesses on the other conical surface of said second pulley, a belt connecting said first pulley to said second pulley for driving said second pulley, said belt comprising a flexible cable having a plurality of spaced ferrules secured to said cable, a stacked assembly of washers mounted on said cable between each adjacent pair of ferrules, the spacing betwene adjacent ferrules being greater than the length of each stacked assembly of washers, flexible means carried by said ferrules and disposed between the adjacent ends of each stacked assembly of washers for positioning each stacked assembly of washers at right angles to said cable, said washers having a central circular opening therethrough of greater diameter than the diameter of said flexible cable for permitting both axial motion and rotation of said washers with respect to said cable, said washers being in registry with the teeth and recesses of each of said pulleys, means for connecting said second pulley to said accessories for driving the same, a yoke extending between said axially movable sheaves for simultaneously moving said sheaves, and actuator means operative upon said yoke for moving said yoke to vary the drive ratio of said drive unit, said actuator means comprising first and second chambers each continuously connected to a source of vacuum and vacuum responsive means responsive to vacuum in said chambers, respectively, and connected to said yoke, and means for controlling the vacuum in said chambers, respectively, said valve means comprising a first centrifugally responsive valve driven at a speed proportional to speed of rotation of said accessories and effective at speeds of rotation below a predetermined speed to connect one of said chambers to atmosphere and at speeds of rotation above said predetermined speed of rotation to block off said one chamber from atmosphere, said valve means also including a second centrifugally responsive valve driven at a speed proportional to the speed of rotation of said accessories and effective at speeds below a second predetermined speed of rotation to connect the other of said chambers to atmosphere and at speeds of rotation above said second predetermined speed of rotation to block off said second chamber from atmosphere, both of said valves being closed in the speed range between said first and second predetermined speeds to block off both of said chambers from atmosphere.

References Cited in the file of this patent
UNITED STATES PATENTS

| | | |
|---|---|---|
| 1,601,662 | Abbott | Sept. 28, 1926 |
| 2,577,913 | Peterson | Dec. 11, 1951 |
| 2,630,132 | Hughes | Mar. 3, 1953 |
| 2,916,024 | Dodge | Dec. 8, 1959 |

FOREIGN PATENTS

| | | |
|---|---|---|
| 1,026,910 | France | Feb. 11, 1953 |
| 63,648 | France | Apr. 20, 1955 |